US012117132B2

(12) United States Patent
Van Bommel et al.

(10) Patent No.: US 12,117,132 B2
(45) Date of Patent: Oct. 15, 2024

(54) LIGHTING EMITTING DEVICE

(71) Applicant: SIGNIFY HOLDING B.V., Eindhoven (NL)

(72) Inventors: Ties Van Bommel, Horst (NL); Rifat Ata Mustafa Hikmet, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 17/778,839

(22) PCT Filed: Nov. 12, 2020

(86) PCT No.: PCT/EP2020/081844
§ 371 (c)(1),
(2) Date: May 21, 2022

(87) PCT Pub. No.: WO2021/099201
PCT Pub. Date: May 27, 2021

(65) Prior Publication Data

US 2022/0403987 A1 Dec. 22, 2022

(30) Foreign Application Priority Data

Nov. 21, 2019 (EP) .................................... 19210581

(51) Int. Cl.
*F21K 9/232* (2016.01)
*F21V 29/70* (2015.01)
(Continued)

(52) U.S. Cl.
CPC .............. *F21K 9/232* (2016.08); *F21V 29/70* (2015.01); *F21Y 2107/00* (2016.08); *F21Y 2115/10* (2016.08)

(58) Field of Classification Search
CPC ...... F21K 9/232; F21V 29/70; F21Y 2107/00; F21Y 2115/10
See application file for complete search history.

(56) References Cited

U.S. PATENT DOCUMENTS 8,408,748 B2 * 4/2013 Janik .......................... F21K 9/23 362/249.05
10,605,413 B1 * 3/2020 Dutta ...................... F21K 9/232
(Continued)

FOREIGN PATENT DOCUMENTS

CN 103953861 A 7/2014
CN 104006321 A 8/2014
(Continued)

OTHER PUBLICATIONS

WO 2016/058539, Apr. 21, 2016, Andrew Yeung. English Translation (Year: 2016).*
(Continued)

*Primary Examiner* — Peggy A Neils

(57) ABSTRACT

A light emitting device (1) comprising at least one LED filament (2) adapted for, in operation, emitting LED filament light, the at least one LED filament comprising a carrier (6) and a plurality of LEDs (5) arranged on the carrier and adapted for, in operation, emitting LED light, and a heat sink element (3), the at least one LED filament (2) being arranged extending spiraling around a vertical center axis LA of the light emitting device, wherein the heat sink element (3) further is arranged extending spiraling around the vertical center axis of the light emitting device, and wherein the heat sink element (3) is arranged extending from the at least one LED filament towards the vertical center axis of the light emitting device.

18 Claims, 4 Drawing Sheets

(51) Int. Cl.
*F21Y 107/00* (2016.01)
*F21Y 115/10* (2016.01)

(56) References Cited

U.S. PATENT DOCUMENTS

| | | | | |
|---|---|---|---|---|
| 2005/0162850 | A1* | 7/2005 | Luk | H05B 45/20 362/227 |
| 2013/0294092 | A1 | 11/2013 | Hussell et al. | |
| 2015/0198320 | A1 | 7/2015 | Kim et al. | |
| 2018/0112831 | A1 | 4/2018 | Huang | |
| 2019/0386185 | A1* | 12/2019 | Jiang | H01L 33/501 |
| 2022/0228715 | A1 | 7/2022 | Van Bommel et al. | |

FOREIGN PATENT DOCUMENTS

| | | | | | |
|---|---|---|---|---|---|
| CN | 203880659 | U | | 10/2014 | |
| CN | 106439568 | A | | 2/2017 | |
| CN | 108916677 | | * | 11/2018 | F21Y 2115/10 |
| CN | 109630921 | A | | 4/2019 | |
| CN | 210567605 | U | | 5/2020 | |
| EP | 3208523 | A1 | | 8/2017 | |
| EP | 3301354 | A2 | | 4/2018 | |
| EP | 3316300 | A1 | | 5/2018 | |
| JP | 2017532793 | A | | 11/2017 | |
| TW | 200928209 | A | | 7/2009 | |
| WO | 2011100195 | A1 | | 8/2011 | |
| WO | WO 2016058539 | | * | 4/2016 | F21S 2/00 |
| WO | 2018001781 | A1 | | 1/2018 | |
| WO | 2019129035 | A1 | | 7/2019 | |
| WO | 2019141155 | A1 | | 7/2019 | |

OTHER PUBLICATIONS

CN 108916677, Liu et al., Nov. 30, 2018, English Translation (Year: 2018).*

* cited by examiner

LIGHTING EMITTING DEVICE

CROSS-REFERENCE TO PRIOR APPLICATIONS

This application is the U.S. National Phase application under 35 U.S.C. § 371 of International Application No. PCT/EP2020/081844, filed on Nov. 12, 2020, which claims the benefit of European Patent Application No. 19210581.5, filed on Nov. 21, 2019. These applications are hereby incorporated by reference herein.

FIELD OF THE INVENTION

The invention relates to a light emitting device comprising at least one LED filament adapted for, in operation, emitting LED filament light, the at least one LED filament comprising a carrier and a plurality of LEDs arranged on the carrier and adapted for, in operation, emitting LED light, and a heat sink element.

BACKGROUND OF THE INVENTION

Incandescent lamps are rapidly being replaced by LED based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One of the concepts is based on LED filaments placed in such a bulb. The appearances of these lamps are highly appreciated as they look highly decorative.

US 2018/0112831 A1 discloses a light-emitting diode (LED) filament with a heat-dissipating structure including multiple LED chips, multiple conductive carriers and a package layer. Each conductive carrier takes the form of a metal sheet and the multiple conductive carriers are spaced apart from each other. Each LED chip is commonly carried by and is electrically connected to two of the multiple conductive carriers adjacent to the LED chip. The package layer covers the multiple LED chips and the multiple conductive carriers with two lateral edge portions of each conductive carrier exposed from the package layer. The LED filament is mounted inside a light bulb. Because the multiple conductive carriers are partially exposed from the package layer, heat generated by the multiple LED chips can be dissipated to an ambient environment without affecting lighting efficiency and light output as a result of accumulated heat.

Current LED filament lamps, however, do not provide sufficient light. The luminous flux of LED filament lamps is typically 300 lm, while general lighting applications require 700 or even 1000 lm output.

It is therefore desired to improve the luminous flux of LED filament lamps without impairing on the LED filament look.

SUMMARY OF THE INVENTION

It is an object of the present invention to overcome this problem, and to provide a light emitting device which has sufficient cooling while the heat sink element of the light emitting device is still unobtrusive enough to ensure that the luminous flux of LED filament lamps may be improved without impairing on the LED filament look.

According to a first aspect of the invention, this and other objects are achieved by means of a light emitting device comprising at least one LED filament adapted for, in operation, emitting LED filament light, the at least one LED filament comprising a carrier and a plurality of LEDs arranged on the carrier and adapted for, in operation, emitting LED light, and a heat sink element, the at least one LED filament being arranged extending spiraling around a vertical center axis of the light emitting device, the heat sink element is arranged extending spiraling around the vertical center axis of the light emitting device, and the heat sink element is arranged extending from the at least one LED filament towards the vertical center axis of the light emitting device.

Thereby, and in particular by providing that the heat sink element is arranged extending from the at least one LED filament towards the vertical center axis of the light emitting device, and by effectively providing the LED filament and the heat sink element as separate elements, a light emitting device is provided with which the luminous flux is improved without impairing on the LED filament look.

In an embodiment, the heat sink element is connected to or in contact with the at least one LED filament at a surface section of the at least one LED filament facing towards the vertical center axis.

Thereby, a light emitting device is provided with an assembly of LED filament and heat sink element not only providing efficient cooling but also being particularly robust and simple in structure.

In some embodiments, the heat sink element is one of spiral shaped heat sink element, a helix-shaped heat sink element or a helicoid-shaped heat sink element or a heat sink element shaped as an Archimedes screw.

Thereby, a light emitting device with a heat sink element providing a particularly efficient cooling is provided for.

In some embodiments, the heat sink element comprises a width Wh, a thickness Th and an aspect ratio AR, the aspect ratio being defined as the ratio of the width Wh and the height Th, and the aspect ratio AR is larger than two or the aspect ratio AR equals five.

Thereby, a heat sink element with a large aspect ratio is provided for, which in turn provides for improved cooling.

In some embodiments, the heat sink element comprises a thickness Th, the at least one LED filament comprises a thickness Tf, and $Th<Tf$, or $Th=0.7*Tf$.

Thereby, an unobtrusive and almost invisible heat sink element which does not interfere with the look of the filament lamp as perceived by an observer is provided for.

In some embodiments, the heat sink element comprises a width Wh, the at least one LED filament comprises a width Wf, and $Wh>2*Wf$ or $Wh=5*Wf$.

Thereby, a heat sink element, which provides for improved cooling, is provided for.

In an embodiment, the spiral shaped heat sink has an inner diameter Dh, the LED filament has an inner diameter Df, and $0.8*Df>Dh>0.2*Df$.

Thereby, an especially unobtrusive and invisible heat sink element which does not interfere with the look of the filament lamp as perceived by an observer and which also provides for optimized cooling is provided for.

In an embodiment, the light emitting device further comprises a stem extending coinciding with the vertical center axis, and at least one of mutually opposite ends of the LED filament and mutually opposite ends of the heat sink element are connected to the stem.

Thereby, a light emitting device with a very robust structure is provided for. In some embodiments, the heat sink element comprises an inner diameter Dh, the stem comprises a diameter Ds, and $Dh>Ds$ or $Dh=Ds$.

Thereby, a light emitting device with not only a very robust structure but which may also be assembled in a particularly simple manner as the heat sink element may be attached directly to the stem is provided for.

In an embodiment, the stem has a length Ls, the heatsink and the LED filament forms an assembly having a length Lhf, and Ls>Lhf.

Thereby, a light emitting device is provided with an assembly of stem, heat sink element and LED filament which has a particularly simple and robust structure.

In some embodiments, the length Lf of the LED filament and the length Lh of the heat sink element fulfils any one of 1.2*Lf>Lh>0.8*Lf, 1.1*Lf>Lh>0.9*Lf and Lh=Lf.

Thereby, an unobtrusive and almost invisible heat sink element which does not interfere with the look of the filament lamp as perceived by an observer is provided for.

In an embodiment, a side of the heat sink element facing the central longitudinal axis LA is non-flat, such as rounded or triangular shaped.

Thereby, a light emitting device which may be assembled in a particularly simple manner is provided for.

In some embodiments, the heat sink element comprises a thermal conductivity of at least 100 W/mK, at least 150 W/mK or at least 200 W/mK.

Thereby a heat sink element is provided with which it has been proved that sufficient cooling for the LEDs of the LED filament may be obtained.

In an embodiment, the heat sink element is made from aluminum and/or copper, such materials providing for an especially high thermal conductivity.

In an embodiment, the heat sink element comprises a surface layer or a coating.

Such a surface layer or coating may provide the heat sink element with a protective layer and/or with a color or look, such as e.g. a metal look giving an industrial design-like appearance, a white color providing for high reflection or a black color providing for improved cooling.

In an embodiment, the heat sink element comprises a plurality of fins arranged along the length of the heat sink element.

Thereby, a heat sink element with not only a further optimized cooling effect, but which may also be attached directly to the stem in a particularly simple manner is provided for.

In an embodiment, the stem and the heatsink are both made of a metal.

Thereby, a heat sink element with improved thermal management and thus cooling is provided for. The stem and the heatsink may be made from the same metal e.g. both of aluminum and/or copper.

Particularly good cooling is obtained when the heat sink element is a monolithic element.

In an embodiment the plurality of LEDs is covered by an encapsulant comprising one or more of a light scattering material adapted for scattering LED light and a luminescent material adapted for at least partly converting LED light into converted LED light.

Thereby, the LED filament light emitted by the LED filament, when in operation, may comprise the LED light and/or the converted light.

In such an embodiment, the heatsink may be contacting or be connected to the LED filament at the carrier and/or at the encapsulant.

By providing an encapsulant, a light emitting device with a particularly robust structure and durability is furthermore provided for.

In some embodiments, the heat sink element comprises a length Lh, a width Wh and a thickness Th, and:

$$Lh>5\text{ cm},\ Lh>8\text{ cm},\ Lh>10\text{ cm or } Lh=15\text{ cm, and/or}$$

$$Th<4\text{ mm},\ Th<3\text{ mm},\ Th<2\text{ mm or } Th=1\text{ mm, and/or}$$

$$Wh>7\text{ mm},\ Wh>10\text{ mm},\ Wh>12\text{ mm or } Wh=15\text{ mm.}$$

In some embodiments, the at least one LED filament comprises a length Lf, a width Wf and a thickness Tf, and:

$$Lf>5\text{ cm},\ Lf>8\text{ cm},\ Lf>10\text{ cm or } Lf=15\text{ cm, and/or}$$

$$5\text{ mm}>Tf>1\text{ mm, or } 4\text{ mm}>Tf>1.5\text{ mm},\ 3\text{ mm}>Tf>1.8\text{ mm or } Tf=2\text{ mm, and/or}$$

$$5\text{ mm}>Wf>1\text{ mm},\ 4\text{ mm}>Wf>1.5\text{ mm},\ 3\text{ mm}>Wf>1.8\text{ mm or } Wf=2\text{ mm.}$$

Such dimensions, especially of the LED filament, have proved to be particularly suitable for a light emitting device which is intended to form part of a light bulb or similar lamp or luminaire. Also, such dimensions of the LED filament and the heat sink element have in combination proved to be particularly suitable for providing a light emitting device obtaining at least some of the above advantages.

The invention furthermore, in a second aspect, concerns a lamp or a luminaire comprising a light emitting device according to the invention.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
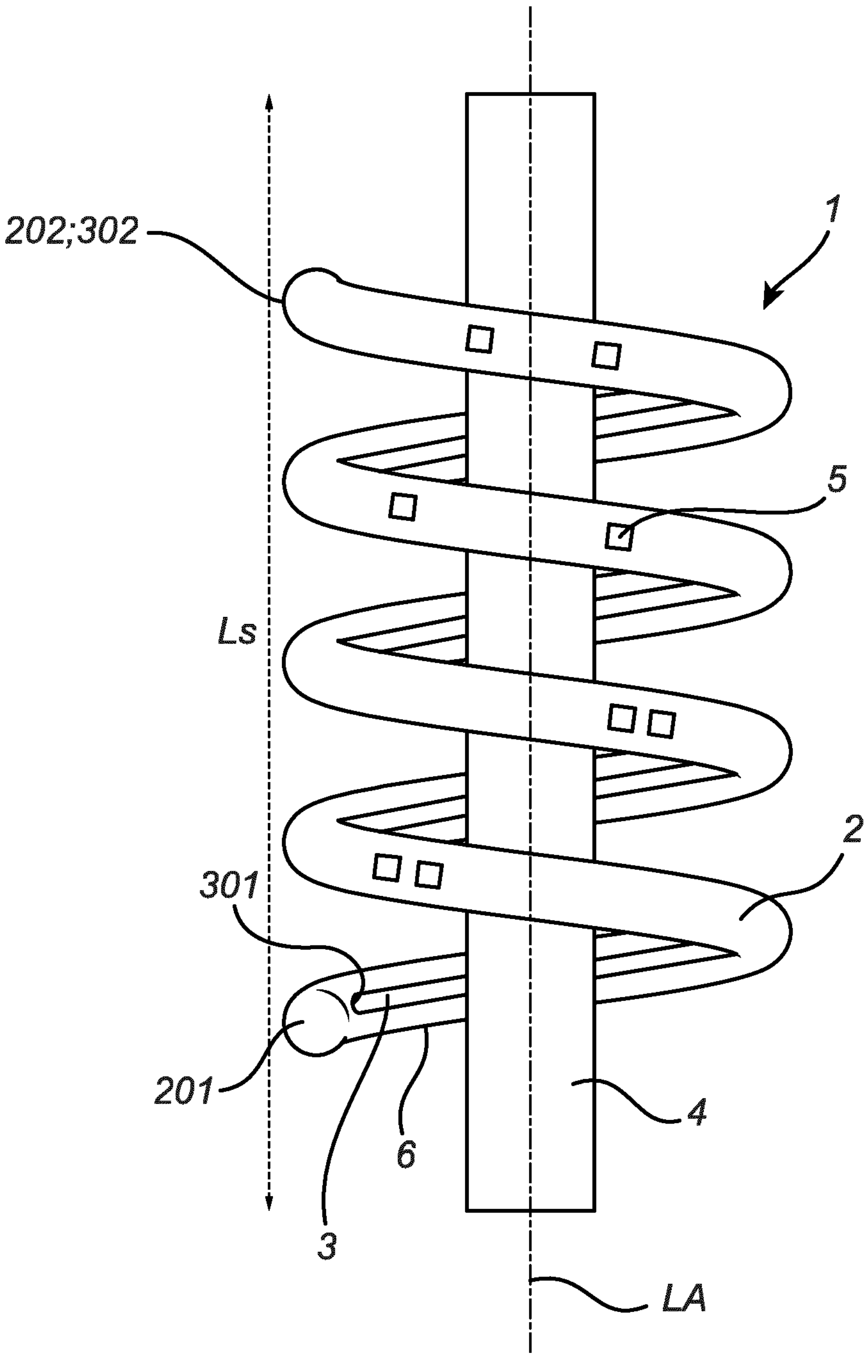
FIG. 1 shows a perspective view of an embodiment of a light emitting device according to the invention.

FIG. 1 shows a perspective view of an embodiment of a light emitting device 1 according to the invention. The light emitting device 1 comprises a LED filament 2 and a heat sink element 3.

Figure 5:
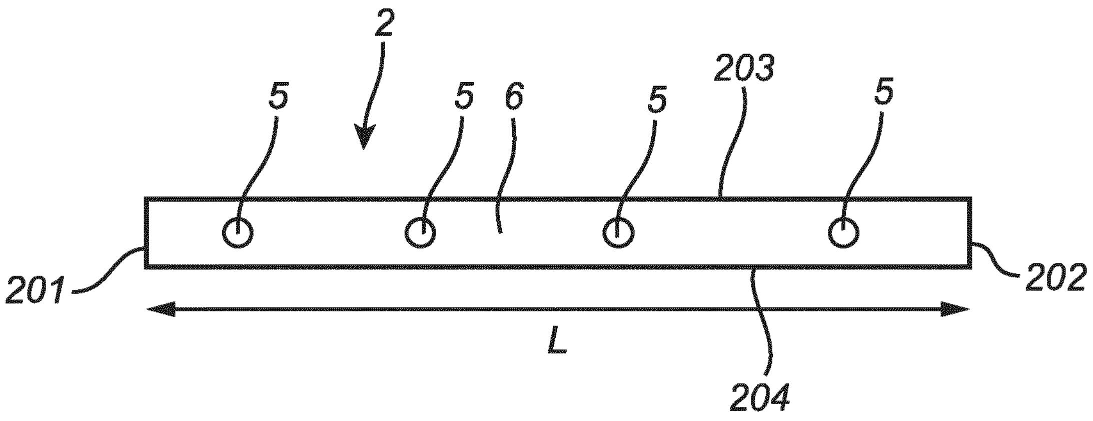
FIG. 5 shows a schematic top view of a LED filament of a light emitting device according to the invention.

Referring also to FIG. 5, the LED filament 2 comprises a carrier 6 and a plurality of LEDs 5 arranged on the carrier 6. The LED filament 2 comprises a first end 201 and a second end 202 as well at two mutually opposite side edges 203 and 204 extending between and connecting the first end 201 and the second end 202.

The plurality of LEDs 5 is adapted for, in operation, emitting light. The LEDs 5 are arranged distributed along a length L of the carrier 6. The LEDs 5 may be evenly or unevenly distributed along the length of the carrier 6. The LEDs 5 may emit light of any desired color. For instance, the LEDs 5 may emit white light. The LED filaments preferably emit white light having a color temperature in the range from 1800 K to 4000 K, or in the range from 1900 K to 3000 K, or even in the range from 200 K to 2500 K, such as for example 2200 K. The color point of the white light may be within 10 SDCM from the BBL, within 7 SDCM, or even within 5 SDCM. The color rendering index may be at least 75, at least 80, or even at least 85. The LEDs 5 may also be adapted for, in operation, emitting LEDs with different color temperatures. The plurality of LEDs 5 may comprise at least 15 LEDs, at least 20 LEDs, or even at least 25 LEDs such as for example 40 or 60 LEDs. The plurality of LEDs 5 may be UV and/or blue LEDs, which is a configuration typically used in combination with a luminescent material. The plurality of LEDs 5 may also be red, green and blue LEDs, which is a configuration that may emit white light, and is typically used in combination with an encapsulant comprising a light scattering material. In another example red and blue LEDs may be used in combination with an encapsulant comprising a luminescent material for partly converting blue light into green/yellow light.

In general, a LED filament is providing LED filament light and comprises a plurality of light emitting diodes (LEDs) arranged in a linear array. Preferably, the LED filament has a length L and a width W, wherein L>5 W. The LED filament may be arranged in a straight configuration or in a non-straight configuration such as for example a curved configuration, a 2D/3D spiral or a helix. Preferably, the LEDs are arranged on an elongated carrier like for instance a substrate, that may be rigid (made from e.g. a polymer, glass, quartz, metal or sapphire) or flexible (e.g. made of a polymer or metal e.g. a film or foil). In case the carrier comprises a first major surface and an opposite second major surface, the LEDs are arranged on at least one of these surfaces. The carrier may be reflective or light transmissive, such as translucent and preferably transparent.

The LED filament may comprise an encapsulant at least partly covering at least part of the plurality of LEDs. The encapsulant may also at least partly cover at least one of the first major or second major surface. The encapsulant may be a polymer material which may be flexible such as for example a silicone. Further, the LEDs may be arranged for emitting LED light e.g. of different colors or spectrums. The encapsulant may comprise a luminescent material that is configured to at least partly convert LED light into converted light. The luminescent material may be a phosphor such as an inorganic phosphor and/or quantum dots or rods.

The LED filament may comprise multiple sub-filaments.

Figure 6:
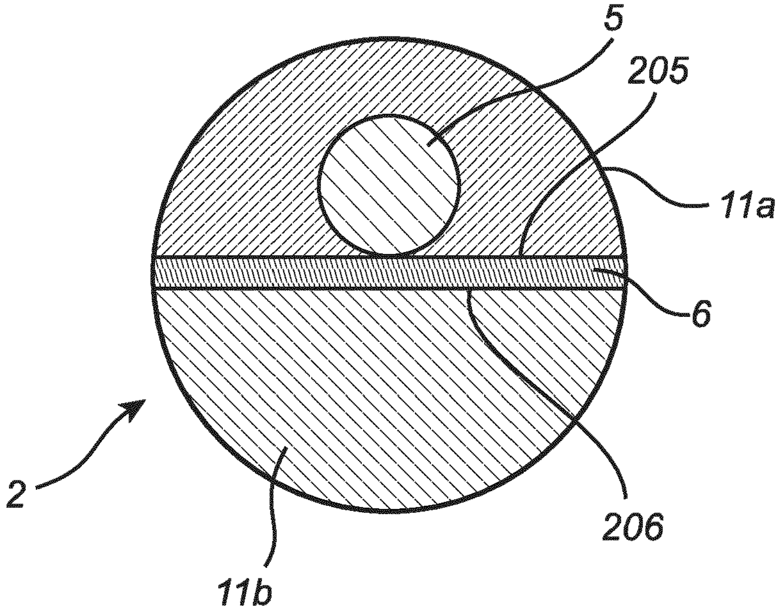
FIG. 6 shows a schematic cross-sectional view of a LED filament of a light emitting device according to the invention, the LED filament comprising an encapsulant.

Referring also to FIG. 6, the LED filament 2 may also comprise an encapsulant 11*a*, 11*b*. The encapsulant 11*a*, 11*b* may at least partly encapsulate the plurality of LEDs 5. The encapsulant 11*a* may also partly or fully cover a first major surface 205, on which the LEDs 5 are arranged, of the carrier 6 of the LED filament 2. The encapsulant 11*b* may also partly or fully cover a second major surface 206 of the carrier 6 opposite to the first major surface 205. The encapsulant 11*a*, 11*b* may be made of a flexible material, such as a heat resistant silicone. The encapsulant 11*a*, 11*b* may comprise a light scattering material such as for example BaSO4, $Al_2O_3$ and/or TiO2 particles. The encapsulant 11*a*, 11*b* may also comprise a luminescent material such as for example a phosphor. The luminescent material is configured to convert LED light into converted light.

Referring again to FIG. 1, the light emitting device 1 further comprises a vertical or vertically extending longitudinal center axis LA. More particularly, in a mounted condition of the light emitting device 1, the center axis LA is arranged vertical or extending vertically. The LED filament 2 is arranged extending spiraling around the vertical center axis LA of the light emitting device 1. More particularly, the LED filament 2 is arranged extending spiraling in an upward direction around the vertical center axis LA of the light emitting device 1. In the mounted condition of the light emitting device 1, the first end 201 of the LED filament 2 is thus arranged in a position below the second end 202 of the LED filament 2. An inner side of the LED filament 2 facing towards the center axis LA may be non-flat, for instance rounded or triangular.

The heat sink element 3 is arranged extending from the LED filament 2 towards the vertical center axis LA of the light emitting device. The heat sink element 3 is further arranged extending spiraling around the vertical center axis LA of the light emitting device 1. More particularly, the heat sink element 3 is arranged extending spiraling in an upward direction around the vertical center axis LA of the light emitting device 1. The heat sink element 3 and the LED filament 2 are thus extending in parallel with one another. In the mounted condition of the light emitting device 1, the first end 301 of the heat sink element 3 is thus arranged in a position below the second end 302 of the heat sink element 3. The heat sink element 3 may be spiral shaped, helix shaped, a helicoid or shaped as an Archimedes screw. As may be seen on FIG. 4, the heat sink element 3 may be connected to or in contact with the LED filament 2 at a surface section 21 of the LED filament 2 facing towards the center axis LA. The LED filament 2 and the heat sink element 3 are separate elements. The LED filament 2 and the heat sink element 3 may be provided in one piece.

Figure 4:
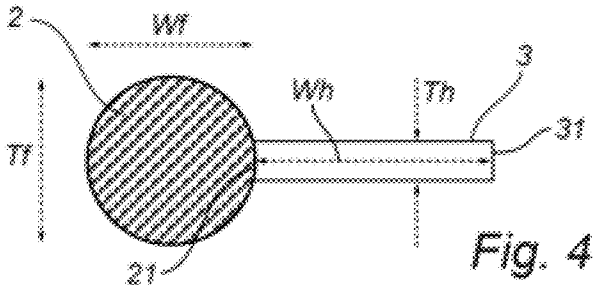
FIG. 4 shows an enlarged cross-sectional view of a part of a light emitting device according to the invention, such as the part IV marked on FIG. 3.

Referring still to FIG. 4, the side 31 of the heat sink element 3 facing towards the center axis LA may be of a shape other than flat. For instance, the side 31 may be rounded or triangular. The heat sink element 3 has a thermal conductivity of at least 100 W/m·K. The heat sink element 3 may be made from aluminum and/or copper. The heat sink element 3 may be a heat pipe. The heat sink element 3 may have a metal look or a white color, or a black color. The heat sink element 3 may be provided with surface layer or a surface coating. The surface layer or a surface coating may provide the heat sink element 3 with a desired color and/or surface texture. The heat sink element 3 may have a plurality of fins, e.g. arranged along the length of the heat sink element 3, to improve thermal management and/or mounting.

Referring also to FIG. 4, the heat sink element 3 has a length Lh, a width Wh and a thickness Th. The length Lh is the extension of the heat sink element 3 along the spiraling shape of the heat sink element 3 between the opposite ends 301 and 302 of the heat sink element 3 and perpendicular to both the width Wh and the thickness Th. The width Wh is the extension of the heat sink element 3 from the surface or surface point of the heat sink element 3 nearest to the LED filament 2 to a mutually opposite surface or surface point of the heat sink element 3. The thickness Th is the extension of the heat sink element 3 in a direction perpendicular to both the width Wh and the length Lh. The heat sink element 3 also has an aspect ratio AR, which is defined as the ratio of Wh and Th. The aspect ratio AR may be larger than 2, larger than 3 or larger than 4, for instance equal to 5.

Likewise, and still referring to FIG. 4, the LED filament 2 has a length Lf, a width Wf and a thickness Tf. The length Lf is the extension of the LED filament 2 along the spiraling shape of the LED filament 2 between the opposite ends 201 and 202 of the LED filament 2 and perpendicular to both the width Wf and the thickness Tf. The width Wf is the extension of the LED filament 2 between the mutually opposite surfaces 203 and 204 (FIG. 5), or in other words from the surface or surface point of the LED filament 2 nearest to the heat sink element 3 to a mutually opposite surface or surface point of the LED filament 2. The thickness Th is the extension of the heat sink element 3 between the mutually opposite major surfaces 205 and 206 (FIG. 6), and thus in a direction perpendicular to both the width Wh and the length Lh. The thickness Th of the heat sink element 3 may be larger than the thickness Tf of the LED filament 2. For instance, the thickness Th of the heat sink element 3 and the thickness Tf of the LED filament 2 may fulfil Th<0.9Tf, Th<0.8Tf or even Th=0.7Tf. Also, the width Wh of the heat sink element 3 and the width Wf of the LED filament 2 may fulfil Wh>2Wf, Wh>3Wf, or even Wh>4Wf.

Figure 3:
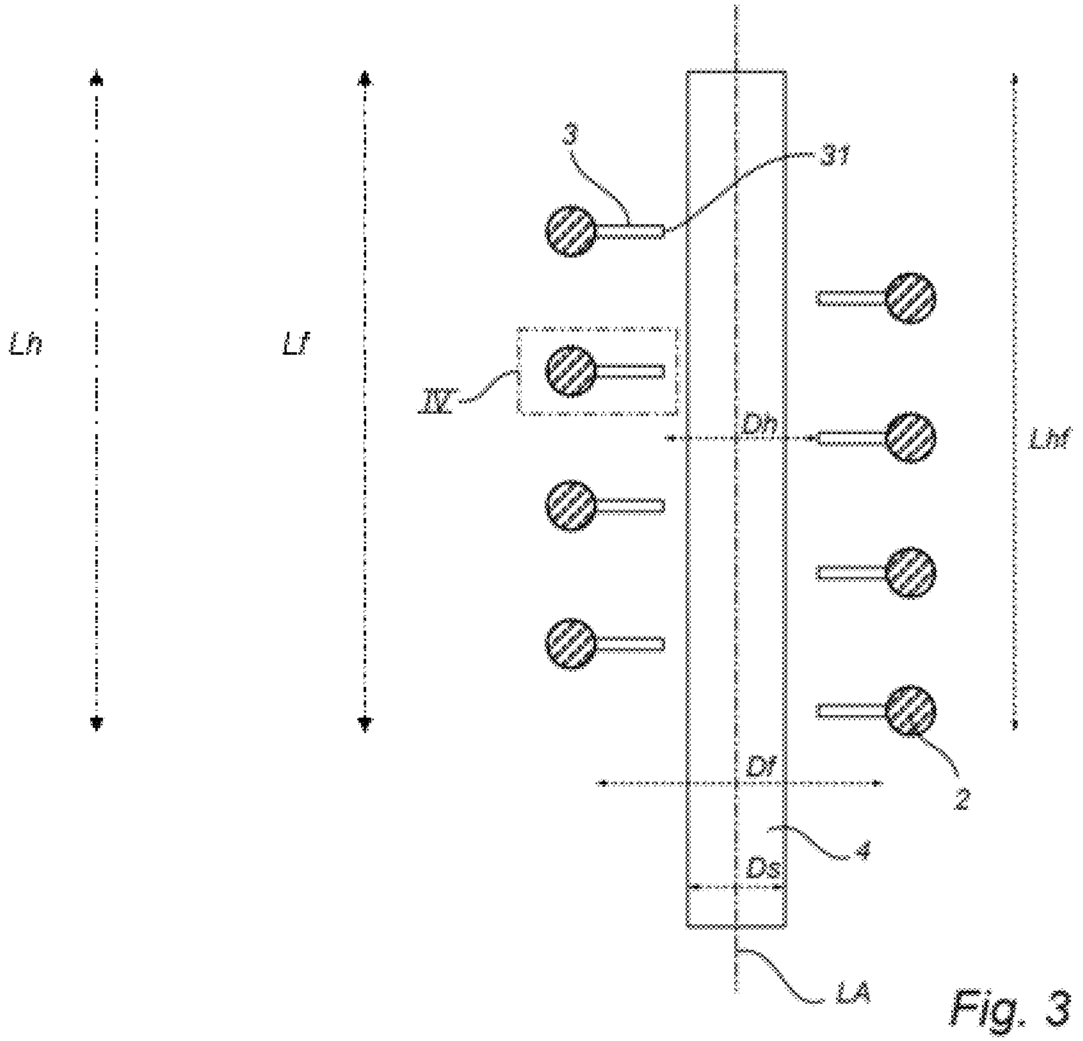
FIG. 3 shows a cross-sectional view of the light emitting device according to FIG. 1.

Furthermore, as shown on FIG. 3, the heat sink element 3 has an inner diameter Dh and the LED filament 2 has an inner diameter Df. For instance, the inner diameter Dh of the heat sink element 3 and the inner diameter Df of the LED filament 2 may fulfil 0.8Df>Dh>0.2Df or 0.7Df>Dh>0.3Df or 0.6Df>Dh>0.4Df. In the embodiment shown, the heat sink element 3 is arranged at an angle of 90 degrees with respect to the vertical center axis LA. In other embodiments, the heat sink element 3 may be arranged at an angle different from 90 degrees with respect to the vertical center axis LA.

In some embodiments such as that shown in FIG. 1, the light emitting device 1 further comprises a stem 4. The stem 4 extends coinciding with the vertical center axis LA. The stem 4 has a length Ls, cf. FIG. 1, and a diameter Ds, cf. FIG. 3. The inner diameter Dh of the heat sink element 3 may be larger than the diameter Ds of the stem 4 such that the spiral shaped heat sink can be mounted around the stem. In this case, at least one of mutually opposite ends 201, 202 of the LED filament 2 and mutually opposite ends 301, 302 of the heat sink element 3 is connected to the stem 4. Alternatively, the inner diameter Dh of the heat sink element 3 may be equal to the diameter Ds of the stem 4, such that the spiral shaped heat sink can be directly fixed to the stem, not only at the mutually opposite ends 301, 302, but also at positions between the mutually opposite ends 301, 302.

The length Lh of the heat sink element 3 and the length Lf of the LED filament 2 may fulfil 1.2Lf>Lh>0.8Lf or 1.1Lf>Lh>0.9Lf or Lh=Lf.

Furthermore, referring to FIG. 3, the heat sink element 3 and the LED filament 2 taken together as an assembly comprise a length Lhf. The length Lhf is the extension of the assembly of the heat sink element 3 and the LED filament 2 in a direction parallel with the longitudinal axis LA and the stem 4 and thus also the length Ls of the stem 4. The length Ls of the stem 4 may be larger than the length Lhf.

Further possible dimensions include the following.

The length Lh of the heat sink element 3 may be more than 5 cm, 8 cm, or 10 cm, such as e.g. 15 cm.

The thickness Th of the heat sink element 3 may be less than 4 mm, 3 mm or 2 mm, such as e.g. 1 mm.

The width Wh of the heat sink element 3 may be more than 7 mm, 10 mm or 12 mm, such as e.g. 15 mm.

The length Lf of the LED filament 2 may be more than 5 cm, 8 cm or 10 cm such as e.g. 15 cm.

The thickness Tf of the LED filament 2 may be between 5 mm and 1 mm, between 4 mm and 1.5 mm or between 3 mm and 1.8 mm, such as e.g. 2 mm.

The width Wf of the LED filament 2 may be between 5 mm and 1 mm, between 4 mm and 1.5 mm or between 3 mm and 1.8 mm, such as e.g. 2 mm.

Figure 2:
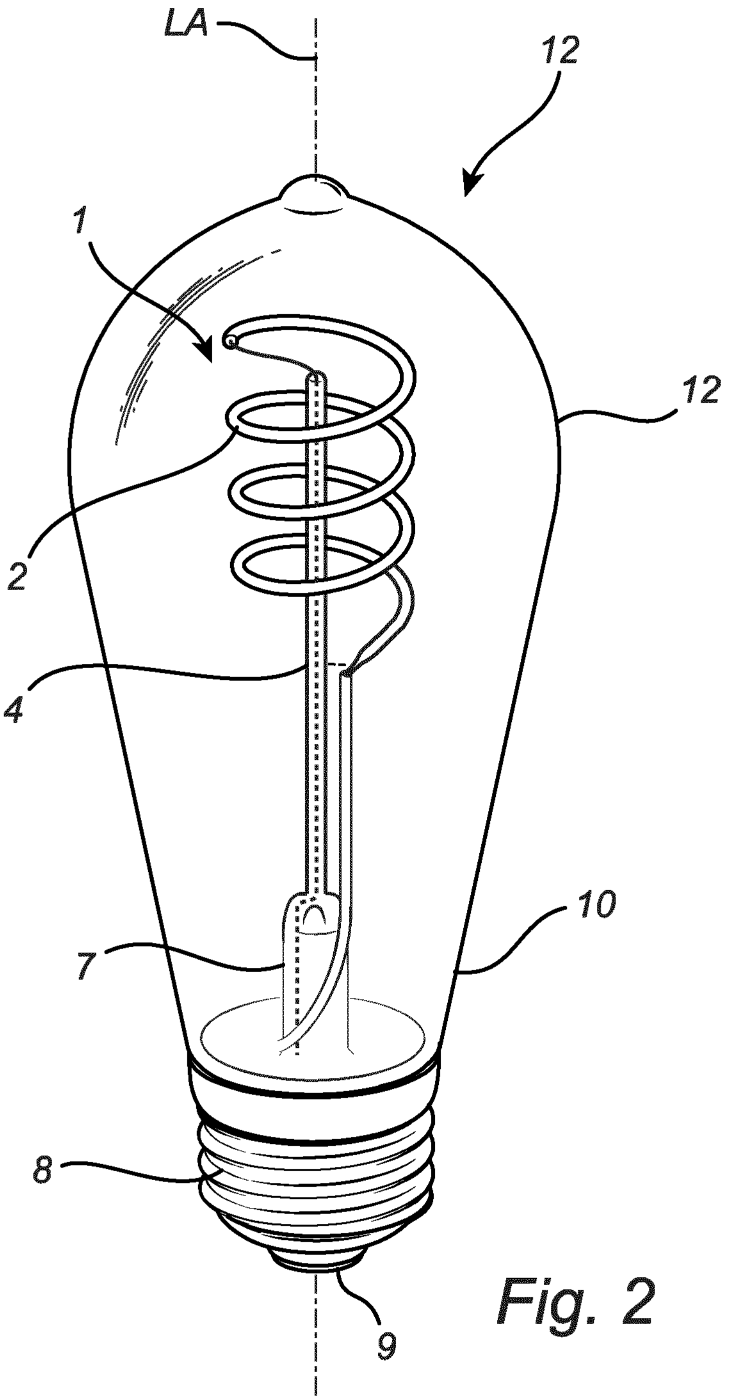
FIG. 2 shows a perspective view of an embodiment of a luminaire comprising a light emitting device according to the invention.

Finally, FIG. 2 shows a luminaire 12 comprising a light emitting device 1 according to the invention in a cross-sectional perspective view.

The luminaire 12 comprises a socket 8 and a base or cap 7 for mechanically and/or electrically connecting the light emitting device 1, and thus the LEDs 5, to the socket 8. The socket 8 may furthermore comprise a terminal 9 for electric connection to a terminal of an external power source. The base 7 may further serve as mounting support for the light emitting device 1, and in particular the stem 4 of the light emitting device 1.

The luminaire 12 further comprises an enveloping structure or bulb 10 partly or fully enveloping the light emitting device 1. In the embodiment shown, the envelope or bulb 10 is arranged in a distance from the light emitting device 1. Alternatively, the envelope or bulb 10 may be spiral shaped and the spiraling LED filament 2 of the light emitting device 1 may be arranged at least partly recessed within the spiral features of the bulb 10.

The light emitting device 1 and/or the luminaire 12 may further comprise driver electronics. The light emitting device 1 and/or the luminaire 12 may still further comprise a controller for individually controlling the LEDs of the LED filament 2.

The luminaire 12 may provide LED filament luminaire light, The LED filament luminaire light comprising the LED filament light. The luminaire 12 may further comprise a reflector configured to partly redirect the LED filament luminaire light.

The person skilled in the art realizes that the present invention by no means is limited to the preferred embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:

at least one LED filament adapted for, in operation, emitting LED filament light, the at least one LED filament comprising a carrier and a plurality of LEDs arranged on the carrier and adapted for, in operation, emitting LED light, and a heat sink element, wherein the heat sink element provides a thermally conductive structure, the at least one LED filament being arranged extending spiraling around a vertical center axis LA of the light emitting device, wherein the heat sink element further is arranged extending spiraling around the vertical center axis of the light emitting device, and wherein the heat sink element is arranged extending from the at least one LED filament towards the vertical center axis of the light emitting device.

2. The light emitting device according to claim 1, wherein the heat sink element is connected to or in contact with the at least one LED filament at a surface section of the at least one LED filament facing towards the vertical center axis LA.

3. The light emitting device according to claim 1, wherein the heat sink element is a spiral shaped heat sink element, a helix-shaped heat sink element, a helicoid-shaped heat sink element or a heat sink element shaped as an Archimedes screw.

4. The light emitting device according to claim 1, wherein the heat sink element comprises a width Wh, a thickness Th and an aspect ratio AR, the aspect ratio being defined as the ratio of the width Wh and the height Th, and wherein the aspect ratio AR is larger than two or the aspect ratio AR equals five.

5. The light emitting device according to claim 1, wherein the heat sink element comprises a thickness Th, wherein the at least one LED filament comprises a thickness Tf, and wherein $Th<Tf$, preferably $Th<0.7*Tf$.

6. The light emitting device according to claim 1, wherein the heat sink element comprises a width Wh, wherein the at least one LED filament comprises a width Wf, and wherein $Wh>2*Wf$, preferably $Wh>5*Wf$.

7. The light emitting device according to claim 1, wherein the heat sink element has an inner diameter Dh, wherein the at least one LED filament has an inner diameter Df, and wherein $0.8*Df>Dh>0.2*Df$.

8. The light emitting device according to claim 1, and further comprising a stem extending coinciding with the vertical center axis LA, and wherein at least one of mutually opposite ends of the LED filament and mutually opposite ends of the heat sink element is connected to the stem.

9. The light emitting device according to claim 8, wherein the heat sink element comprises an inner diameter Dh, wherein the stem comprises a diameter Ds, and wherein $Dh>Ds$ or $Dh=Ds$.

10. The light emitting device according to claim 8, wherein the stem has a length Ls, wherein the heat sink element and the at least one LED filament forms an assembly having a length Lhf, and wherein $Ls>Lhf$.

11. The light emitting device according to claim 1, wherein the at least one LED filament comprises a length Lf, wherein the heat sink element comprises a length Lh, and wherein the length Lf and the length Lh fulfils any one of $1.2*Lf>Lh>0.8*Lf$, $1.1*Lf>Lh>0.9*Lf$ and $Lh=Lf$.

12. The light emitting device according to claim 1, wherein a side of the heat sink element facing the central longitudinal axis LA is non flat such as rounded or triangular shaped.

13. The light emitting device according to claim 8, wherein the stem and the heat sink element are made both of a metal.

14. The light emitting device according to claim 1, wherein the plurality of LEDs is covered by an encapsulant comprising one or more of a light scattering material adapted for scattering LED light and a luminescent material adapted for at least partly converting LED light into converted LED light.

15. A lamp and/or a luminaire comprising a light emitting device according to claim 1.

16. An LED filament light bulb comprising:

at least one LED filament adapted for, in operation, emitting LED filament light, the at least one LED filament comprising a transparent substrate carrier and a plurality of LEDs arranged on the carrier and adapted for, in operation, uniformly emitting LED light, and a heat sink element, wherein the heat sink element provides a thermally conductive structure, the at least one LED filament being arranged extending spiraling around a vertical center axis LA of the light emitting device, wherein the heat sink element further is arranged extending spiraling around the vertical center axis of the light emitting device, and wherein the heat sink element is arranged extending from the at least one LED filament towards the vertical center axis of the light emitting device.

17. The light emitting device according to claim 1, wherein the heat sink element comprises a plurality of fins arranged along the length of the heat sink element.

18. The light emitting device according to claim 1, wherein a thickness of the heat sink element is larger than a thickness of the LED filament.

* * * * *